United States Patent Office 3,334,422
Patented Aug. 8, 1967

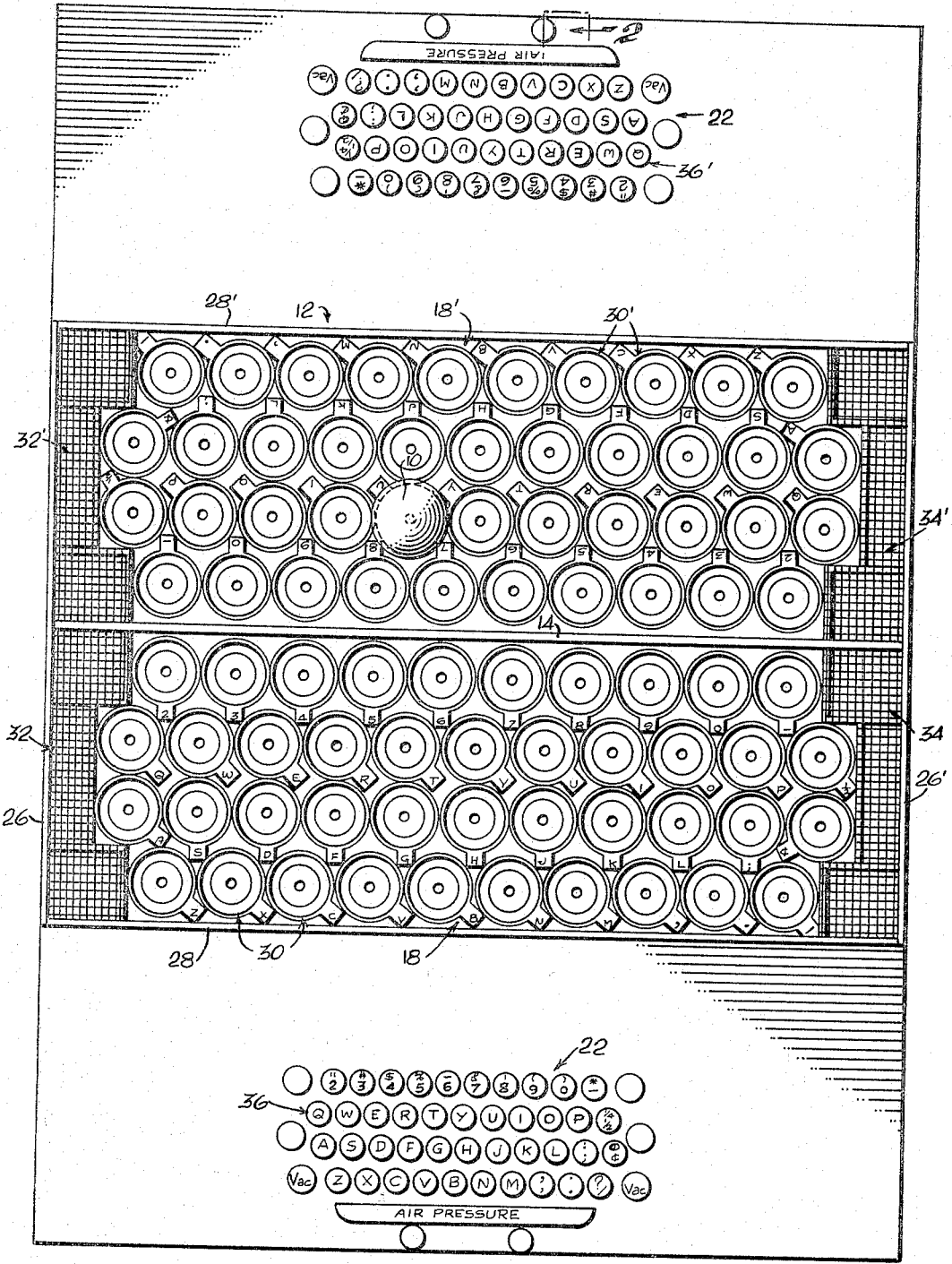

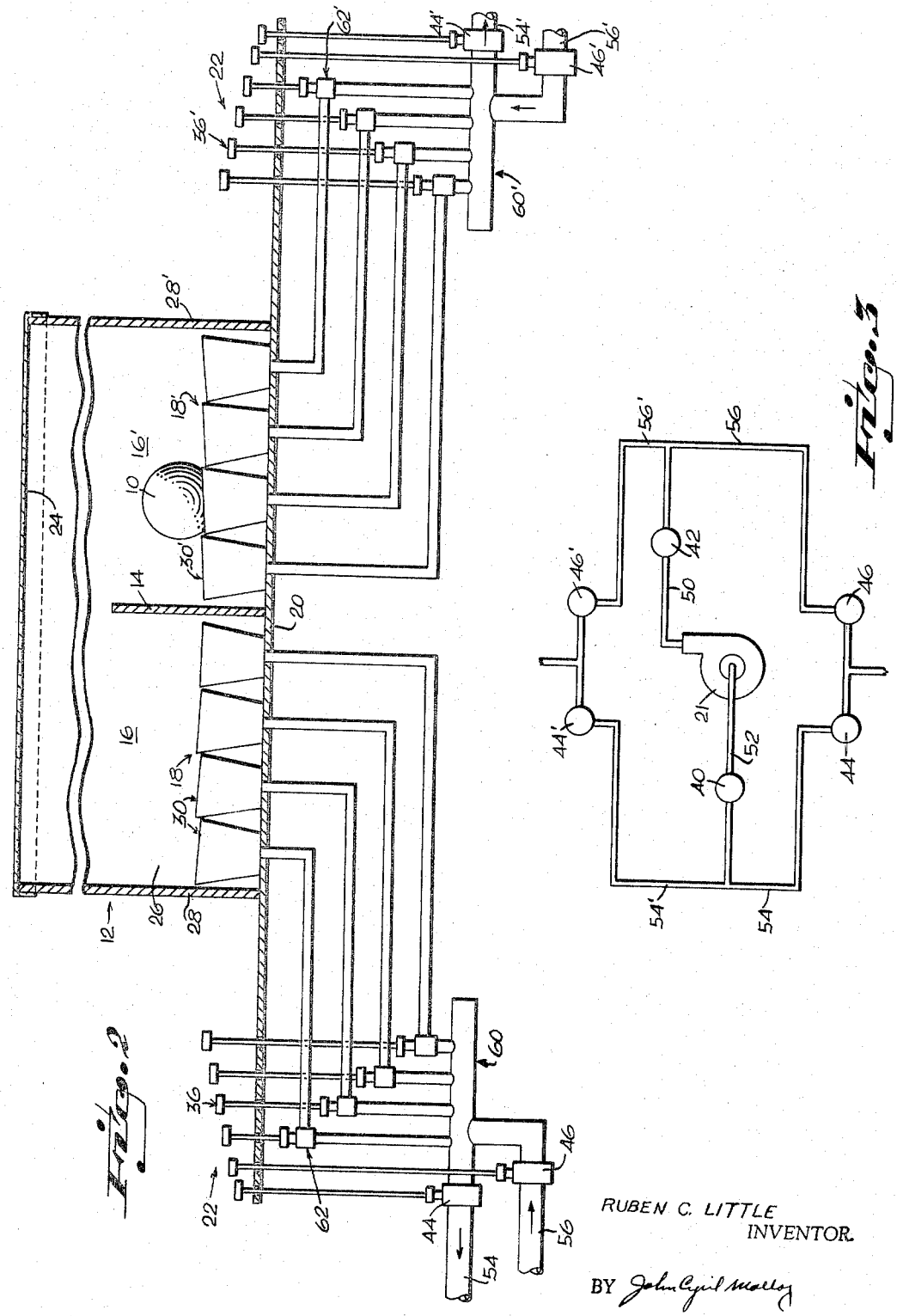

3,334,422
EDUCATIONAL TOY
Ruben C. Little, 7800 SW. 52nd Court,
South Miami, Fla. 33143
Filed Apr. 5, 1965, Ser. No. 445,560
9 Claims. (Cl. 35—5)

This invention relates to an educational toy and, more particularly, to an educational toy having a keyed control board for manipulating a movable member.

In the past, many sports have been reduced to gaming devices which incorporate the basic rules, or rules quite similar to, those of many generally popular sports, such as handball or tennis. Also, gaming devices have been associated with many educational toys, the purpose of which is to aid pupils in their attempt to master specific subject matter. Such gaming devices incorporate the subject matter to be learned in such a manner that the participating pupils are compelled to repetitively use the subject matter in a competitive exercise which excites and stimulates interest for extended periods, to accelerate mastery of otherwise arduous routines.

This invention is directed to an educational toy which aids in developing incentives that help accelerate and render more pleasurable the task of learning the location of the indicia on a typewriter keyboard. This educational toy includes a gaming device having a typewriter-type keyboard with indicia thereon for actuating propelling means with similar indicia thereon to move a ball back and forth against or over a barrier. The gaming device may incorporate the basic rules or similar rules of such popular sports as handball or tennis.

Accordingly, it is an object of the invention to provide an educational toy for teaching the fundamentals of typing, having a gaming floor with at least one barrier connected to the floor and with propelling means connected to the floor for propelling a ball toward the barrier, and a control board resembling the conventional typewriter keyboard with a plurality of control keys having distrinctive indicia thereon for actuating the propelling means.

Another object of the invention is to provide an educational toy including a container with a movable member therein, having a floor, a barrier across the floor, launching means adjacent the floor for propelling the ball toward the barrier; and a control board adjacent the container having a plurality of keys controlling the launching means, with the keys arranged so as to resemble the pattern of a conventional typewriter keyboard.

Another object of the invention is to provide an educational toy including a holding and launching means connected to a floor for propelling a movable member toward a solid barrier connected to the floor, and a control board adjacent one end of the floor having a plurality of keys connected to control the holding and launching means, the keys being arranged so as to resemble the pattern of a conventional typewriter keyboard, and having at least three horizontal rows; the first upper row having at least ten keys, the second row having at least nine keys and the third row having at least seven keys. The holding means include a plurality of inverted ungula conical structures having receptacles therein sized to allow the movable member to lie partially therein.

A further object of the invention is to provide an educational toy having a container with a ball therein and with means attached to a floor in the container for grasping and launching the ball, the means including a plurality of inverted ungula conical structures for the ball to rest thereon with the conical structures having receptacles therein sized to seat the ball, pressure means supplying air to each of the conical structures, and a control board adjacent one end of the container having a plurality of control keys thereon with each control key connected to a separate pressure means.

Additionally, it is an object of this invention to provide an educational toy including a container, with a ball therein, having a floor and at least one wall attached to the floor; grasping and launching means attached to the floor having a plurality of inverted ungula conical structures each of which has a receptacle therein; a pressure and vacuum supply means connected to a pressure and vacuum supply system by pressure and vacuum valve means, with the supply system connected to the receptacle in each conical structure by intermediate valve means; and a control board adjacent one end of the container including a pressure control key connected to control the pressure valve, a vacuum control key connected to control the vacuum valve, and intermediate control keys connected to control the intermediate valve means.

Other objects of the invention will be apparent from the following description taken in conjunction with the drawings.

In the drawings:

FIGURE 1 is a plan view of the educational toy including launching means and control keys on either side of the intermediate barrier;

FIGURE 2 is a side elevation, in cross section, taken along the plane of the line 2—2 of FIGURE 1 and looking in the direction of the arrows; and FIGURE 3 is a schematic diagram of a pumping system.

Referring now to the drawings, the structure of the educational toy is generally shown in FIGURE 2. The playing of the game involves the successive grasping and propelling of a ball 10 from the playing field toward a barrier or wall. As shown in the preferred embodiment, the ball 10 is moved and successively manipulated to hurl the ball back and forth over the barrier between the two courts 16 and 16′ by contestants who successively select a particular means from a plurality of holding and launching means, generally shown at 18 and 18′, which will propel the ball in a manner similar to the way tennis players compete.

The holding and launching means of the toy are connected to a pump 21 of a pressure and vacuum means, shown in FIGURE 3, to supply the energy for propelling the ball 10 by air blasts and for grasping the ball 10 by suction. To activate a particular one of the holding and launching means, a pupil must depress an appropriate control key on one of the control boards 22 or 22′; if the appropriate control key is depressed, the holding and launching means beneath the ball 10 is activated to propel or grasp the ball, as will be explained. Each of the particular holding and launching means of each court is connected to a separate control key in the adjacent key board. Distinctive indicia are on each of the holding and launching means with similar indicia on each connected control key. To manipulate the ball in such a manner as to defeat an opponent, a pupil has to quickly identify the indicia on the holding and launching means on which the ball 10 rests or is about to rest with an appropriate control key, and in this manner pupils using the toy quickly learn the location of the indicia on the control board, which is similar to that of a typewriter keyboard.

Referring now to the structure, the playing field is enclosed by a tray-type container 12, shown in FIGURES 1 and 2, provided with a transparent top 24, a floor or base 20, side walls 26 and 26′, and end walls 28 and 28′. The transparent top 24 in addition to captivating the ball, allows a pupil to observe the movements of the ball 10 and the indicia on the holding and launching means, generally 18 and 18′. The intermediate wall 14 is placed across the floor 20 between the side walls 26 and 26′ to divide the playing field into two courts, 16 and 16'. The ball 10 is placed in the container 12 for manipulation back and forth over the intermediate wall 14 and, in practice, quite often bouncing against the interior surfaces of the container 12. At rest, the ball 10 is seated on the perimeter of one of the inverted ungula cones 30 and 30', which defines a receptacle sized to allow the ball 10 to lie partially therein. Each conical structure is attached to the floor 20 with the longitudinal center line of the conical structure tilted toward the intermediate wall 14. Preferably, each of the various conical structures is poised on the floor such that a ball propelled from it is aimed across the barrier; that is such that a plane at a right angle to the plane of the floor and which plane includes the longitudinal center line of each of the particular conical structures, intersects the intermediate wall 14. Each of the conical structures is connected to the pressure and vacuum means so that when energized, as will be explained, each of the conical structures is adapted to grasp the ball 10 by suction when the receptacle is evacuated and to launch the ball 10 in a trajectory over the barrier by an air blast when the receptacle is pressurized. Pressure means may also be attached to other portions of the floor 20, such as, below the screen covering the slanted deflector shelves 32–32' and 34–34', as well as between the conical structures to prevent the ball 10 from resting in certain undesired positions, such as between the structures or in foul territory.

Eeach control board 22 or 22' is composed of keys in the conventional pattern of a typewriter keyboard and the board is supported on an extension of the floor 20 of the container 12 to control the ball 10 when in the adjacentmost court. Each control board 22 or 22' has a plurality of intermediate control keys, generally shown at 36 or 36', each of which is connected to a separate conical structure in the adjacent court for manipulating the ball 10. A distinctive indicia, such as the indicia appearing on a typewriter keyboard pattern, is on each intermediate control key with corresponding similar indicia on each connected conical structure. Additional control keys are provided, as shown in FIGURES 1 and 2, marked as "air pressure" and "vac," for controlling the pressure and vacuum means.

The pressure and vacuum means is shown in FIGURE 3; it includes a centrifugal pump 21 powered by any well known means and a dual system is provided to connect the centrifugal pump 21 and the conical structures of each court 16 or 16'. The centrifugal pump 21 is connected to master relief valves 40 and 42, vacuum control 44, and pressure control valve 46. The delivery or outlet of the centrifugal pump 21 is connected to the pressure control valve 46 by line 56 and by line 50 with the relief valve 42 therein for allowing continuous normal operation of the pump. The intake of the centrifugal pump 21 is connected to the vacuum valve 44 by line 54 and by line 52 with the relief valve 40 therein for allowing continuous normal operation of the pump. The pressure and vacuum control or selector valves 46 and 44, respectively, are connected to a pressure and vacuum supply system or header 60, shown in FIGURE 2, for controlling the state or condition within the supply system; the respective pressure and vacuum control valves, 46 and 44, are in turn controlled by keys marked "air pressure" and "vac" (for vacuum), in the control board 22. The supply system is connected to the receptacle in each conical structure in the court 16 with an intermediate valve, generally shown as 62, therebetween. Each intermediate valve is connected to a separate intermediate control key. The duplicate system connects the receptacle of each conical structure in court 16' by intermediate control valves 62' to a supply system 60' which is connected to the pressure control or selector valve 46' and vacuum control valve 44'. The pressure control valve 46' is connected to the delivery or outlet of the centrifugal pump 21 by lines 54' and 52. The vacuum control or selector valve 44' is connected to the intake valve of the centrifugal pump 21 by lines 55' and 50.

The educational toy may be utilized after activating the pump 21 and placing a ball in the container, in a special serving structure, not shown, or on any of the conical structures 30 or 30'. Alternatively, additional air pressure means may be employed to move the ball into the serving position without raising the top of the container. The game begins by serving the ball over the intermediate wall; the bar marked "air pressure" on the control board adjacent the ball is depressed to activate the supply system and, then, the intermediate control key having indicia similar to the indicia on the corresponding conical structure holding the ball is depressed to propel the ball over the intermediate wall. The player controlling the opposite control board must depress one of the selector keys marked "vac," and, then, select the appropriate control key to evacuate the conical structure in the path of the ball's trajectory to grasp the ball. This procedure is repeated each time the ball is propelled back over the intermediate wall. In each instance, the appropriate key must be selected by identification of the indicia on each control key which on repetition teaches the players the standard location of the indicia on the typewriter keyboard.

The above described arrangements are illustrative of this invention. Numerous other arrangements may be devised by one skilled in the art without departing from the spirit and scope of the invention.

What is claimed is:

1. In an educational and amusement device, a base, a first plurality of upwardly-facing fluid jet nozzles fixed with and distributed over said base, each said nozzle having an upwardly-facing open end to receive a projectile in obturating position therein, a first keyboard comprising a first plurality of individually operable keys, a first plurality of valves, an operating connection between each key of said first keyboard and a respective one of said valves, header means connected with the inlet of all said valves and adapted for connection with a source of fluid under pressure, and a plurality of conduits each connecting the outlet of a respective one of said valves with a corresponding one of said nozzles.

2. The device of claim 1, and a wall fixed with said base and upstanding therefrom at one side of said first plurality of nozzles, said nozzles being inclined toward said wall at an acute angle to the vertical.

3. The device of claim 1, a pump having a pressure delivery outlet and a suction inlet, first pipe means including a first selector valve and connecting said outlet to said header means, second pipe means including a second selector valve, and connecting said inlet to said header means, first and second selector keys each adjacent said keyboard, and operating connections between said first and second selector keys and said first and second selector valves.

4. The device of claim 1, the keys of said first keyboard being of a number and arrangement to simulate the keyboard of a standard typewriter, and said nozzles being similarly arranged, each key controlling a similarly-arranged one of said nozzles.

5. The device of claim 4, each said key of said first keyboard being labeled with a respective one of the letters of the alphabet, each said nozzle being labeled with a letter corresponding to its respective controlling key.

6. The device of claim 2, a second plurality of upwardly-facing fluid jet nozzles fixed with and distributed over said base on the side of said wall opposite to said first plurality of nozzles, adjacent to said wall and inclined at an acute angle to the vertical toward said wall, a second keyboard comprising a second plurality of individually operable keys, a second plurality of valves, operating connections between each key of said second keyboard and a respective one of said second plurality of valves, second header means, the inlet of all said second plurality of valves being connected with said second header means, and a second plurality of conduits each connecting the outlet of a respective one of said second plurality of valves with a respective one of said second plurality of nozzles.

7. The device of claim 6, a source of fluid under pressure, a source of vacuum, first pipe means connected with said source of fluid under pressure and having first and second branches connected with said first and second header means, respectively, first and second selector valves each in a respective one of said first and second branches, second pipe means connected with said source of vacuum and having third and fourth branches connected with said first and second header means, respectively, third and fourth valves each in a respective one of said third and fourth branches, means adjacent said first keyboard for selectively and individually controlling said first and third selector valves, and means adjacent said second keyboard for selectively and individually controlling said second and fourth valves.

8. The device of claim 7, said first keyboard being fixed with said base, adjacent said first plurality of nozzles controlled thereby and remote from said second keyboard, said second keyboard being fixed with said base adjacent said second plurality of nozzles and on the side of said wall opposite to said first keyboard and remote therefrom.

9. The device of claim 1, each said nozzle having an upwardly-facing circular discharge opening to receive a spherical projectile in obturating position therein, side and end walls fixed with said base and forming therewith an enclosure for said nozzles, and a transparent cover over said enclosure to confine a projectile therewithin, said nozzles being arranged with their upwardly-facing openings substantially coplanar and in closely-spaced relation so that a ball descending thereon comes to rest in obturating relation with the opening of one nozzle.

References Cited

UNITED STATES PATENTS 3,113,776  12/1963  Romei _____ 273—85

FOREIGN PATENTS 915,671  7/1954  Germany.
502,165  1939  Great Britain.

EUGENE R. CAPOZIO, *Primary Examiner.*

R. E. KLEIN, W. NIELSEN, *Assistant Examiners.*